2,323,152

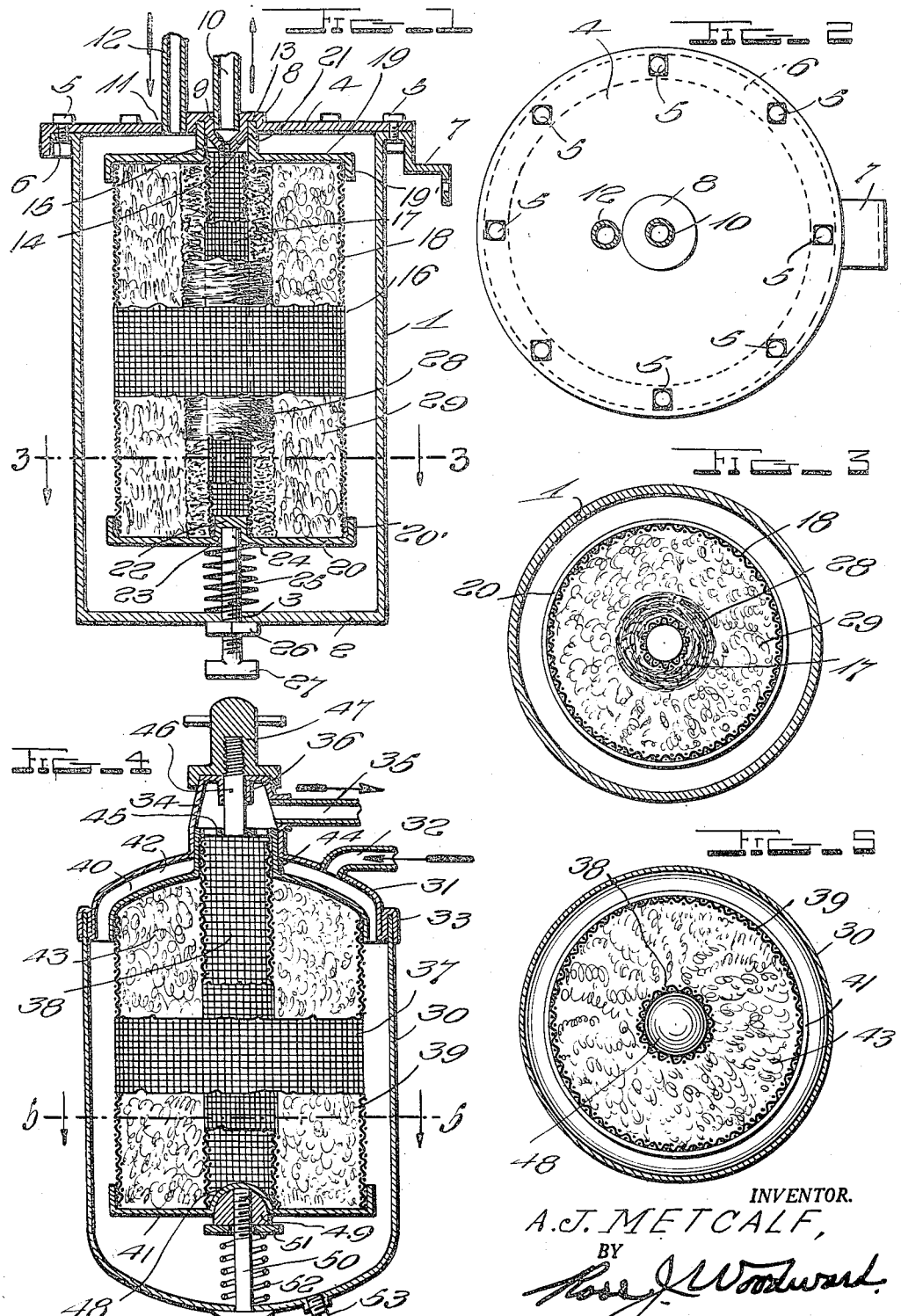
June 29, 1943.   A. J. METCALF   2,323,152
OIL FILTER
Filed Oct. 23, 1941
INVENTOR.
A. J. METCALF,
BY
ATTORNEY Patented June 29, 1943

UNITED STATES PATENT OFFICE 2,323,152

OIL FILTER

Andrew J. Metcalf, Ashland, Wis.

Application October 23, 1941, Serial No. 416,251

4 Claims. (Cl. 210—140)

This invention relates to oil filters and it is one object of the invention to provide a filter particularly adapted for use in connection with the engine of an automobile and, when installed in the oil line thereof, serving very effectively to remove carbon and other dirt from the oil. It will thus be seen that the circulating oil will be kept free from dirt and may be used for a very long period of time.

Another object of the invention is to provide a filter wherein a filtering cartridge is mounted in a casing in such spaced relation to the walls and bottom of the casing that a large quantity of oil may accumulate in the casing about the cartridge and carbon or other dirt in the oil have an opportunity to settle in the bottom of the casing. Therefore, a large part of the heavier dirt in the oil will be separated from the oil by gravity and lighter dirt removed by the filtering material of the cartridge.

Another object of the invention is to so mount the cartridge that a solid top for the same is disposed under the oil inlet of the casing where it will serve as a deflector and cause the incoming oil to be spread or deflected and caused to gently move downwardly about the cartridge and through the filtering material of the cartridge.

Another object of the invention is to provide a filter of such construction that the cartridge may be easily applied or removed and when in place remain in proper position relative to the casing.

Another object of the invention is to provide a cartridge which is of special formation and consists of inner and outer masses of filtering material confined between sleeves of wire screening, the inner mass of material being of greater density than the outer mass so that any dirt which passes through the outer mass will be stopped by the inner mass and only clean oil delivered to the bearings and moving elements of the engine.

In the accompanying drawing:

Fig. 1 is a sectional view taken vertically through the improved filter.

Fig. 2 is a top plan view of the filter.

Fig. 3 is a sectional view taken transversely through the filter on the line 3—3 of Fig. 1.

Fig. 4 is a sectional view taken vertically through a filter of a modified construction.

Fig. 5 is a transverse sectional view on the line 5—5 of Fig. 4.

My improved filter has a casing I which is formed of metal and has a bottom 2 formed with a center opening 3. A cover 4 closes the top of the casing and is detachably held in engagement with walls of the casing by screws 5 which pass through openings formed in the cover and are screwed into threaded openings formed in the outstanding flange 6 which surrounds the upper end of the casing. A bracket 7 is carried by the flange 6 and extends outwardly therefrom radially of the casing so that it may be secured to a support and mount the casing in a vertical position.

At its center, the cover 4 is formed with an upwardly extending boss 8 formed with a center socket 9 to receive the outlet pipe 10 through which clean oil flows to the bearings of the engine. A second opening 11 is formed through the cover at the periphery of the boss to receive the pipe 12 through which oil is delivered to the filter and the under face of the cover is formed with a circular groove or recess 13 which is concentric with the boss and the socket and surrounds a depending boss 14. The boss 14 tapers downwardly and, at its lower end or tip, is formed with an opening 15 which communicates with the bottom of the socket 9 so that oil may pass out of the filter and flow through the pipe 10. The pipes 10 and 12 form part of the oil line through which oil is delivered to the bearings and moving parts of the engine and, since the oil passes through the filter in order to reach the pipe 10, dirt will be removed from the oil by the filter and clean oil will be delivered to the pipe 10.

Within the casing I is a cartridge 16 through which oil to be cleaned passes. This cartridge has a center sleeve or core 17 formed of wire screening but it should be noted that the screening from which the sleeve 18 is formed is of quarter inch mesh while the sleeve 17 is formed of eighth inch mesh. Upper and lower heads 19 and 20 are provided for the cartridge and have marginal flanges 19' and 20' which fit snugly about the outer sleeve 18. The upper head has an upstanding tubular neck 21 which fits into the annular groove 13 in enclosing relation to the depending boss 14 and the diameters of the neck and inner sleeve 17 are such that the protruding upper end of the inner sleeve fits snugly within the lower portion of the neck. The lower end of the inner sleeve fits snugly about an upstanding boss 22 located centrally of the lower head 20 and centrally of this boss 22 the lower head is formed with a socket 23 to receive the upper end of a stem 24 which extends vertically through the opening 3 in threaded engagement with the bottom 2 of the container.

A coil spring 25 surrounds the stem with its lower end resting on the bottom of the casing and its upper end bearing against the lower head of the cartridge and urging the cartridge upwardly. By this arrangement, the cartridge will be subjected to upward pressure and its neck held in the groove 13 the heads 19 and 20 being likewise held in engagement with ends of the sleeves. A lock nut 26 is provided on the stem to secure it in adjusted position and at its lower end the stem is provided with a cross head 27 so that it may be easily turned and adjusted.

As oil passes through the cartridge, dirt is to be removed and, to accomplish this, there is provided an inner mass of filtering material 28 consisting of wool yarn wound about the inner sleeve or core 17 and an outer mass of filtering material 29 consisting of white cotton waste packed into the outer sleeve about the wool yarn. The cotton waste is of less density than the wool yarn and, therefore, the oil may flow through this outer filtering material more readily than it can flow through the inner filtering material. Therefore, when the filter is in use, the dirty oil will first flow rather freely through the outer filtering material after passing through the outer sleeve of screening, which holds back grit and scale and large particles of carbon, and the cotton waste will retain the major portion of the dirt in the oil. The partially cleaned oil will then pass through the denser inner filtering material 28 and fine dirt will be held back by this mass of wool yarn and only clear oil reach the inner core or sleeve. The clear oil entering the inner sleeve flows upwardly therein and, after passing through the opening 15, flows through pipe 10 to the bearings of the engine. The dirty oil which enters the casing from pipe 12 strikes the solid head 19 and then spreads out horizontally until it reaches margins thereof and flows downwardly about the cartridge. Since the stream of oil entering the casing is broken up and diverted by striking the head 19, it loses its force and, as it moves downwardly about the cartridge, large particles of carbon and other foreign matter will settle to the bottom of the casing and accumulate in the sump formed by the space between the lower end of the cartridge and the bottom of the casing. When it is necessary to drain out the accumulated muck in the sump, it is merely necessary to unscrew the stem and withdraw it from the opening 3 and the muck may then drain out through said opening. Since the spring 25 remains in place, it will support the cartridge and prevent it from dropping out of proper position in the casing. By removing the screws 5, the casing and cartridge may be separated from the cover and the cartridge removed from the casing for replacement by another.

In Figs. 4 and 5, there has been illustrated a filter of a modified construction. This filter has a casing 30 closed at its top by a cover 31 formed with an opening to receive the inlet pipe 32 and having its marginal portion crimped to form a channel 33 into which the upper end of the casing fits. The casing may be held in the channel by frictional grip, or by screws or equivalent removable fasteners. A dome 34 extends upwardly from the cover centrally thereof, and this dome is formed with a side opening to receive the outlet pipe 35 and, at its top, is provided with an inwardly extending collar 36. The cartridge 37 is housed within the casing and has an inner sleeve or core 38 and an outer sleeve 39, both of which are formed of wire screening. The upper and lower heads 40 and 41 of the cartridge are formed of solid metal and since the upper head is smaller than the cover 31, it may fit within the cover in spaced relation thereto to provide a space or passage 42 through which oil flows downwardly after entering the casing from pipe 32. Before the heads are applied, space in the cartridge between the inner and outer sleeves 38 and 39 is filled with cotton waste 43 which serves as filtering material, it being understood that the inner sleeve may be covered with a wrapping of wool yarn to serve as an inner filtering medium, if desired, and the cotton waste packed into the cartridge between the yarn and the outer sleeve. The inner sleeve is of greater height than the outer sleeve and its upper end portion fits into a neck 44 which projects upwardly from the center of the upper head 40 and has a perforated top or spider 45 at its upper end. A post 46 extends upwardly from the top 45 and outwardly through the collar 36, the protruding upper end of this post or stem being threaded so that a nut 47 may be applied and screwed tightly into place against the top of the dome 34 to suspend the cartridge in the casing. At its lower end, the inner sleeve or core 38 fits about an upstanding dome-shaped boss 48 pressed upwardly from the lower head. This boss not only serves to center the lower end of the inner sleeve, but also serves as a socket to receive a hemispherical block 49 which is threaded upon the upper end of a stem or bolt 50. This stem is passed upwardly through an opening formed centrally of the bottom of the casing and carries a washer 51 against which bears the upper end of a coil spring 52. The lower end of the spring rests upon the bottom of the casing and tension of the spring urges the washer and the block upwardly so that the cartridge will be well supported. A drain opening which is normally closed by a plug 53, is formed through the bottom of the casing and when this plug is removed, sediment may flow out of the casing. The oil to be filtered enters the casing through pipe 32 and after striking the upper head of the cartridge, flows downwardly in the casing and passes inwardly through the cartridge until it reaches the inner sleeve or core. During this inward movement of the oil, foreign matter therein is removed by the filtering material and the clear oil flows upwardly through the inner sleeve and through the perforated top 45 of the neck 44 into the dome 34 from which it passes to pipe 35 through which it flows to the bearings of the engine.

Having thus described the invention, what is claimed is:

1. An oil filter comprising a casing having a bottom and side walls, a cover for said casing having an upstanding boss at its center and a depending boss under the first boss, the under face of the cover being formed with a groove surrounding the depending boss, said bosses defining a socket open at its top and having an opening at the center of its bottom constituting an outlet, the cover being also formed with an inlet, a filtering cartridge in said casing having upper and lower heads and a center sleeve of perforated material, the upper head having an upstanding tubular neck receiving the upper end of the center sleeve and fitting snugly about the depending boss and into said groove, the lower head being formed with a centrally located upstanding lug fitting into the lower end of the center sleeve, said lug having a socket therein opening through the under face of the lower head, a stem threaded through the bottom of said casing and extending vertically in the casing with its upper end engaged in the socket of the lower head, and a spring coiled about said stem with its lower end resting on the bottom of the casing and its upper end bearing against the lower head and urging the cartridge upwardly.

2. An oil filter comprising a casing having a bottom and side walls, a cover for said casing having an upstanding dome at its center, the dome being formed with an outlet at one side and the cover being provided with an inlet, a filtering cartridge in said casing having upper and lower heads, the upper head having an outlet neck extending upwardly therefrom and snugly received in the dome, a stem fixed to and extending upwardly from the upper end of said neck and outwardly through the top of the dome, and a nut threaded on the protruding upper portion of the stem.

3. An oil filter comprising a casing having a bottom and side walls, a cover for said casing having an upstanding dome at its center, the dome being formed with an outlet at one side and the cover being provided with an inlet, a filtering cartridge in said casing having upper and lower heads, the upper head having an outlet neck extending upwardly therefrom and snugly received in the dome, the lower head being formed with a socket at its center, a stem passing vertically through the bottom of the casing, a semi-circular block threaded on the upper end of said stem and fitting into the socket, a washer fitting about the stem under said block, and a spring coiled about the stem with its lower end resting on the bottom of the casing and its upper end engaging the washer and urging the cartridge upwardly.

4. An oil filter comprising a casing having a top and a bottom and side walls, the top being formed with an outlet and with a seat about the outlet, said casing also having an inlet, a filtering cartridge in said casing having upper and lower heads, an outlet neck extending upwardly from the upper head and engaged in said seat and communicating with the outlet of the casing, an upstanding boss carried by the lower head defining a socket open at its bottom, a perforated core extending vertically through the cartridge and having its upper end engaged in said neck and its lower end fitting snugly about the boss, a stem passing vertically through the bottom of said casing with its upper end engaged in said socket, and a spring about said stem urging said cartridge upwardly.

ANDREW J. METCALF.